(12) United States Patent
Baek et al.

(10) Patent No.: US 9,614,198 B2
(45) Date of Patent: Apr. 4, 2017

(54) BATTERY CELL SHRINK-WRAP METHOD AND ASSEMBLY

(71) Applicant: FORD GLOBAL TECHNOLOGIES, LLC, Dearborn, MI (US)

(72) Inventors: Hyung Min Baek, Ann Arbor, MI (US); Brian Utley, Canton, MI (US)

(73) Assignee: Ford Global Technologies, LLC, Dearborn, MO (US)

( * ) Notice: Subject to any disclaimer, the term of this patent is extended or adjusted under 35 U.S.C. 154(b) by 154 days.

(21) Appl. No.: 14/294,846

(22) Filed: Jun. 3, 2014

(65) Prior Publication Data

US 2015/0349302 A1    Dec. 3, 2015

(51) Int. Cl.
| | |
|---|---|
| *H01M 2/04* | (2006.01) |
| *H01M 2/02* | (2006.01) |
| *H01M 10/625* | (2014.01) |
| *H01M 10/653* | (2014.01) |
| *H01M 10/647* | (2014.01) |

(52) U.S. Cl.
CPC ......... *H01M 2/043* (2013.01); *H01M 2/024* (2013.01); *H01M 2/0292* (2013.01); *H01M 2/0439* (2013.01); *H01M 2/0482* (2013.01); *H01M 10/625* (2015.04); *H01M 10/647* (2015.04); *H01M 10/653* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 4,188,443 A | 2/1980 | Mueller et al. | |
| 4,492,071 A | 1/1985 | Gibson | |
| 5,050,368 A | 9/1991 | Noh | |
| 7,174,697 B2 | 2/2007 | Hada et al. | |
| 2007/0128513 A1* | 6/2007 | Hatta | H01M 2/021 429/176 |
| 2008/0131764 A1 | 6/2008 | Saiki | |
| 2008/0251114 A1* | 10/2008 | Tanaka | B65D 75/002 136/251 |
| 2012/0225331 A1 | 9/2012 | Tartaglia | |
| 2013/0260197 A1* | 10/2013 | Okada | H01M 2/1077 429/90 |
| 2015/0179990 A1* | 6/2015 | Utley | H01M 2/024 429/120 |

OTHER PUBLICATIONS

WO2012/067045 to Okada published May 2012.*
PowerStream, "Engineering Guidelines for Designing Battery Packs", Mar. 20, 2014, pp. 1-7.

* cited by examiner

*Primary Examiner* — Patrick Ryan
*Assistant Examiner* — Wyatt McConnell
(74) *Attorney, Agent, or Firm* — Carlson, Gaskey & Olds, P.C.

(57) ABSTRACT

An example battery cell shrink-wrapping method includes covering a side of a battery cell with a section of a shrink-wrap material. The side interfaces with a cold plate when the battery cell is within a battery pack.

16 Claims, 9 Drawing Sheets

BATTERY CELL SHRINK-WRAP METHOD AND ASSEMBLY

BACKGROUND

This disclosure relates generally to shrink-wrap for a battery cell.

Electric vehicles are driven, at least part of the time, using a battery-powered electric machine. Example electric vehicles include hybrid electric vehicles (HEVs), plug-in hybrid electric vehicles (PHEVs), and electric vehicles (EV).

A powertrain of an electric vehicle is typically equipped with a battery pack having battery cells that store electrical power for powering the electric machine. The battery cells may be charged prior to use. The battery cells may be recharged during a drive by regeneration braking or an internal combustion engine.

Electrically isolating portions of the battery cells from other areas of the vehicle may be required. Electrically isolating the battery cells while providing adequate cooling to the battery cells can be difficult.

SUMMARY

A battery cell shrink-wrapping method according to an exemplary aspect of the present disclosure includes, among other things, covering a side of a battery cell with a section of a shrink-wrap material. The side interfaces with a cold plate when the battery cell is within a battery pack.

In another example of the foregoing method, the side faces downward when the battery cell is within the battery pack.

In another example of any of the foregoing methods, the section is seamless.

In another example of any of the foregoing methods, the side is a first side and the section is a first section, and the method further comprises placing a second section of the shrink-wrap material against a second side of the battery cell and placing a third section of the shrink-wrap material against a third side of the battery cell.

In another example of any of the foregoing methods, the method includes joining laterally outer portions of the second section with laterally outer portions of the third section.

In another example of any of the foregoing methods, the second and third sides extend from opposing edges of the first side transversely to the first side.

In another example of any of the foregoing methods, the method includes covering at least one laterally outward facing side of the battery cell with shrink-wrap material during the joining.

In another example of any of the foregoing methods, the method includes heating the shrink-wrap material after the joining to shrink the shrink-wrap material to the battery cell.

In another example of any of the foregoing methods, the method includes covering a fourth side of the battery cell during the heating to block heat shrink material from covering the fourth side. The fourth side faces away from the first side.

In another example of any of the foregoing methods, the method includes wrapping a cap covering the fourth side during the heating rather than wrapping the fourth side.

In another example of any of the foregoing methods, the method includes compressing the laterally outer portions of the second section and the laterally outer portions of the third section during the joining.

In another example of any of the foregoing methods, the second side and the third side interface with separators when the battery cell is within the battery pack.

In another example of any of the foregoing methods, the method includes inserting the battery cell within a pocket provided by a cell holder when placing the second section against the second side and when placing the third section against the third side.

A battery cell assembly according to an exemplary aspect of the present disclosure includes, among other things, a case having a side to interface directly with a cold plate within a battery pack, and a section of a shrink-wrap material covering the side.

In another example of the foregoing assembly, the section is seamless.

In another example of any of the foregoing assemblies, the section is a first section and the side is a first side, and further comprising a second section of the shrink-wrap material covering a second side of the case and a third section of the shrink-wrap material covering a third side of the case. The first section, the second section, and the third section are seamless.

In another example of any of the foregoing assemblies, the second section and the third section are joined at a seam to cover at least a portion of a laterally outward facing side of the case.

In another example of any of the foregoing assemblies, the case includes laterally outward facing sides each covered by a section of shrink-wrap material having a seam.

In another example of any of the foregoing assemblies, the case includes at least five distinct sides covered by the shrink-wrap material.

In another example of any of the foregoing assemblies, two of the sides are covered by shrink-wrap having seams, and three of the sides are covered by shrink-wrap having no seams.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Referring to FIGS. 1 to 4, battery cells 10 can be used to store and supply power for an electric vehicle.

The example battery cells 10 each include a case 14. Portions of the case 14 are covered in a shrink-wrap 18. When the battery cells 10 are installed, for example, within a battery pack of an electric vehicle, the shrink-wrap 18 electrically isolates portions of the cases 14 from surrounding structures and from adjacent battery cells 10'.

The example shrink-wrap 18 is a polyethylene terephthalate material. Other materials are possible, such as poly (vinyl chloride), polyolefins such as polyethylene and polypropylene, or multilayered film combining any of these. An additional layer of elastomeric materials such as ethylene-propylene and ethylene propylene diene rubber, and thermoplastic films such as ethylene-vinyl acetate copolymer can be added to the multilayer construction to meet specific mechanical and thermal properties. The example shrink-wrap 18 can be from 0.07 to 0.10 millimeters thick.

The battery cells 10 each include a first side 20, a second side 22, a third side 24, a fourth side 26, a fifth side 28, and a sixth side 30. In this example, the first side 20, the second side 22, the third side 24, the fourth side 26, and the fifth side 28 are covered in the shrink-wrap 18. The remaining sixth side 30 is not covered in the shrink-wrap 18. Although the example battery cells 10 are hexahedral, other geometries are possible.

Figure 4:
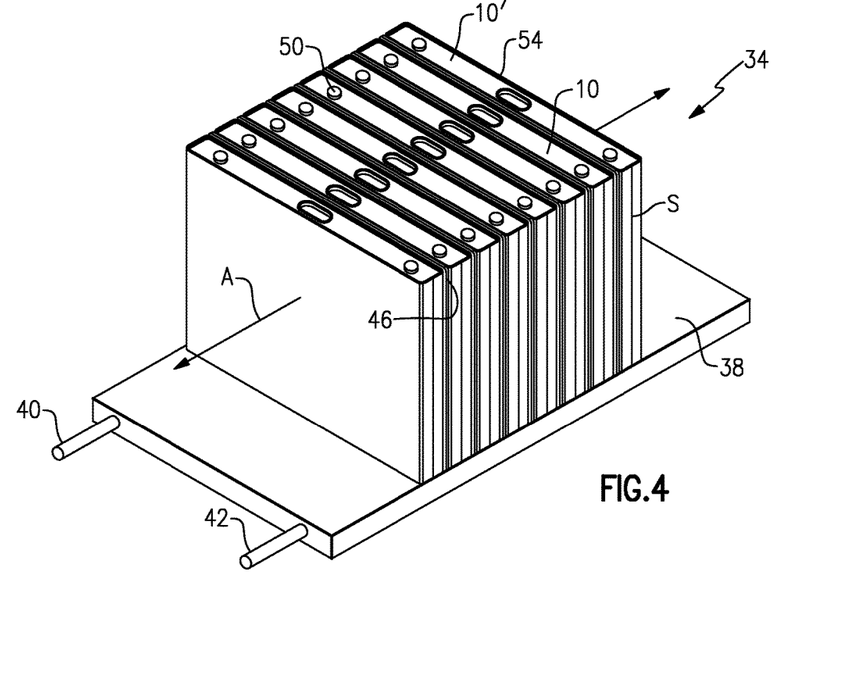
FIG. 4 shows a partial array of battery cells disposed on a cold plate.

In an installed position within the vehicle, the battery cells 10 are arranged to form an array 34 of a battery pack. The array 34 is disposed on a cold plate 38.

During operation, the battery cells 10 generate thermal energy. If not removed, the thermal energy can build up within the cells and reduce both cell performance and life. Coolant circulating through the cold plate 38 carries thermal energy from the cell 10 to prevent excessive thermal energy buildup. The coolant circulates through channels of the cold plate 38 from an inlet 40 to an outlet 42.

In the installed position, the first sides 20 of the battery cells 10 interface with the cold plate 38. Notably, the sides of the battery cells 10 interfacing with the cold plate 38 are covered in shrink-wrap 18.

The first side 20 is generally, the side interfacing with the cold plate 38. The first sides 20 of the example battery cells 10 are directed downwardly when the battery cells 10 are in an installed position within an electric vehicle. Other orientations are possible in other examples.

In this example, the shrink-wrap 18 covering the first side 20 is seamless. That is, there are no seams within the shrink-wrap 18 across the entirety of the first side 20, and across the entire interface between the battery cells 10 and the cold plate 38.

Without seams, the thickness of the shrink-wrap across the first side is relatively uniform in thickness. The uniform thickness facilitates a robust thermal coupling of the battery cells 10 to the cold plate 38. This enhances the effectiveness of thermal energy transfer from the battery cells 10 to the cold plate 38.

Seams in the interface between the battery cells 10 and the cold plate 38 may space the battery cells 10 further from the cold plate 38, which undesirably degrades transfer of thermal energy to the cold plate 38. The seams, as can be appreciated, would have a thickness that could be greater or less than a thickness of the shrink-wrap 18. Eliminating seams from first side 20 can reduce the likelihood of, among other things, short-circuiting due to a damaged wrap, and insufficient or non-uniform cooling.

The battery cells 10 are arranged with the other cells along an axis A. Separators 46 are positioned between axially adjacent battery cells 10 and 10'. The cells 10 may be under axial compression within a battery pack. End plates (not shown) at opposing axial ends of the array along with other array structures may facilitate this compression when these two end plates are attached to sidewalls (also not shown) to form the array 34.

The second side 22 and the third side 24 face axially in this example. The separators 46 contact the second side 22 and third side 24 of axially adjacent ones of the battery cells 10.

The shrink-wrap 18 covering the second side 22 and the third side 24 is also seamless. The thickness of the shrink-wrap 18 covering these sides is this relatively uniform. This ensures a compact and consistent interface between the battery cells 10 and the separators 46.

The fourth sides 26 and the fifth sides 28 face laterally outward from the axis A. The fourth sides 26 and the fifth sides 28 may interface with sidewalls (not shown) of the array 34.

The fourth side 26 and the fifth side 28 include seams S. In this example, the only seams of the shrink-wrap 18 secured to the case 96 are located at the fourth side 26 and the fifth side 28. Thus, all seams S in the example cell 10 are confined to laterally outboard edges of the battery cells 10.

Figures 1, 2:
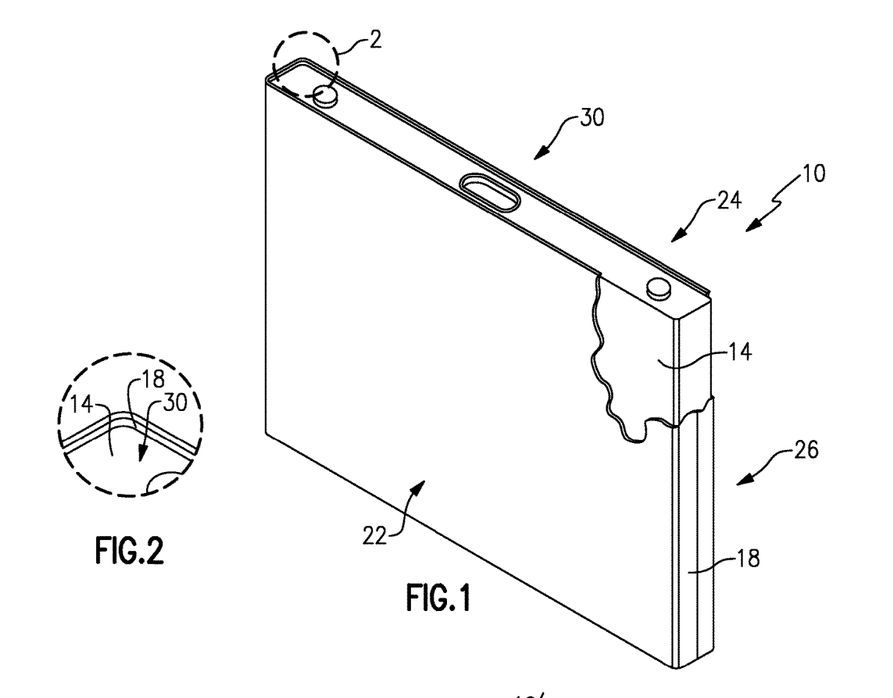
FIG. 1 shows a perspective view of an example battery cell for use in an electric vehicle.
FIG. 2 shows a close-up view of area 2 in FIG. 1.
Figure 3:
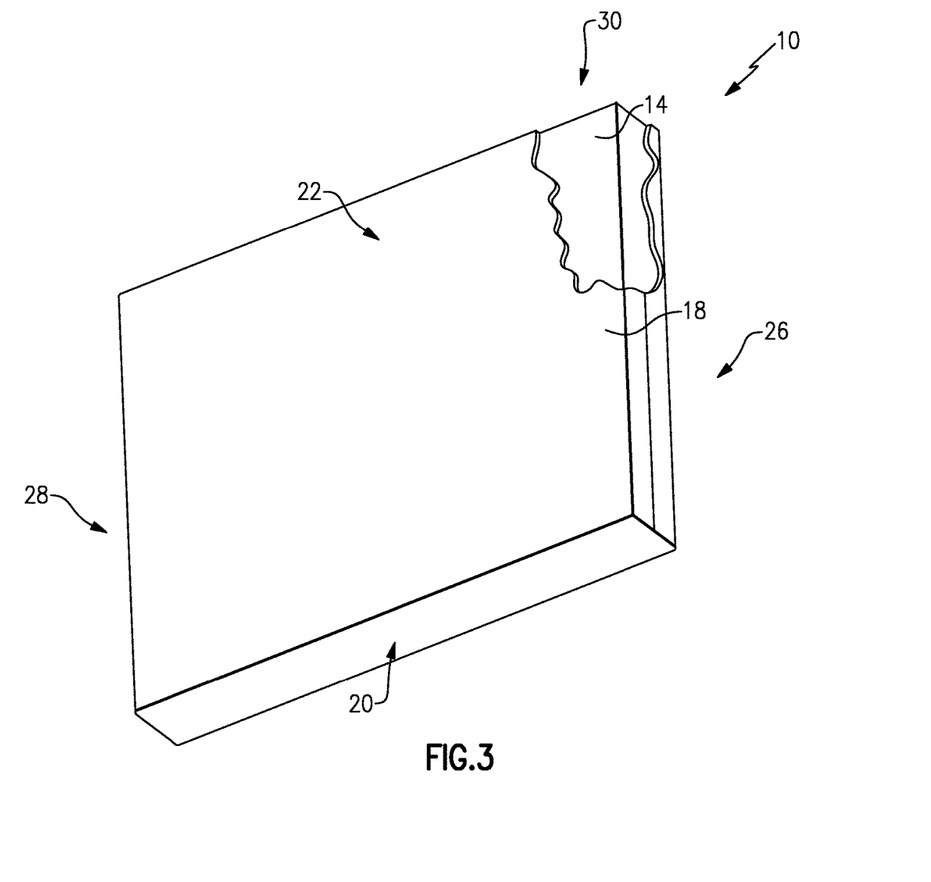
FIG. 3 shows another perspective view of the battery cell of FIG. 1.

The sixth sides 30 of the battery cells 10 include terminals 50, vents 54, and other types of connections and paths from the interior of the battery cells 10. Within a battery pack, bus bars (not shown) can be placed adjacent the sixth sides 30 to electrically connect a vehicle with the battery cells 10 through the terminals 50.

A method of wrapping the cell 10 with the shrink-wrap 18 will now be described in connection with FIGS. 5 to 11. An example shrink-wrap assembly 80 includes a first carrier conveyor 84 and a second carrier conveyor 88. The first carrier conveyor 84 holds a plurality of caps 92, which connect to a case 96 of a battery cell as a stage of assembly shown in FIG. 6.

Figure 6:
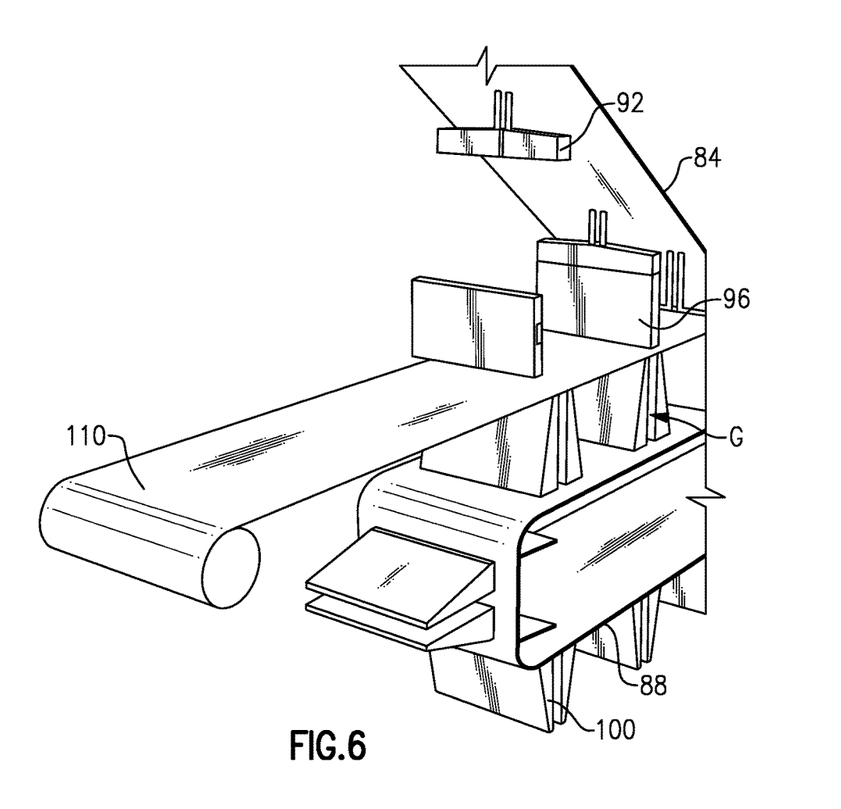
FIG. 6 shows a perspective view of entry stages of the shrink-wrapping assembly of FIG. 5.

When secured to the case 96, the cap 92 covers the sixth side 30 including the terminals of the case 96. The cap 92 may be either a thermoset or thermoplastic syntactic foam in some examples. The example case 96 is primarily aluminum.

Arms (not shown) may contact laterally outer surfaces of the case 96 to stabilize the case 96 during assembly and to bring the case 96 into contact with the cap 92.

Figure 5:
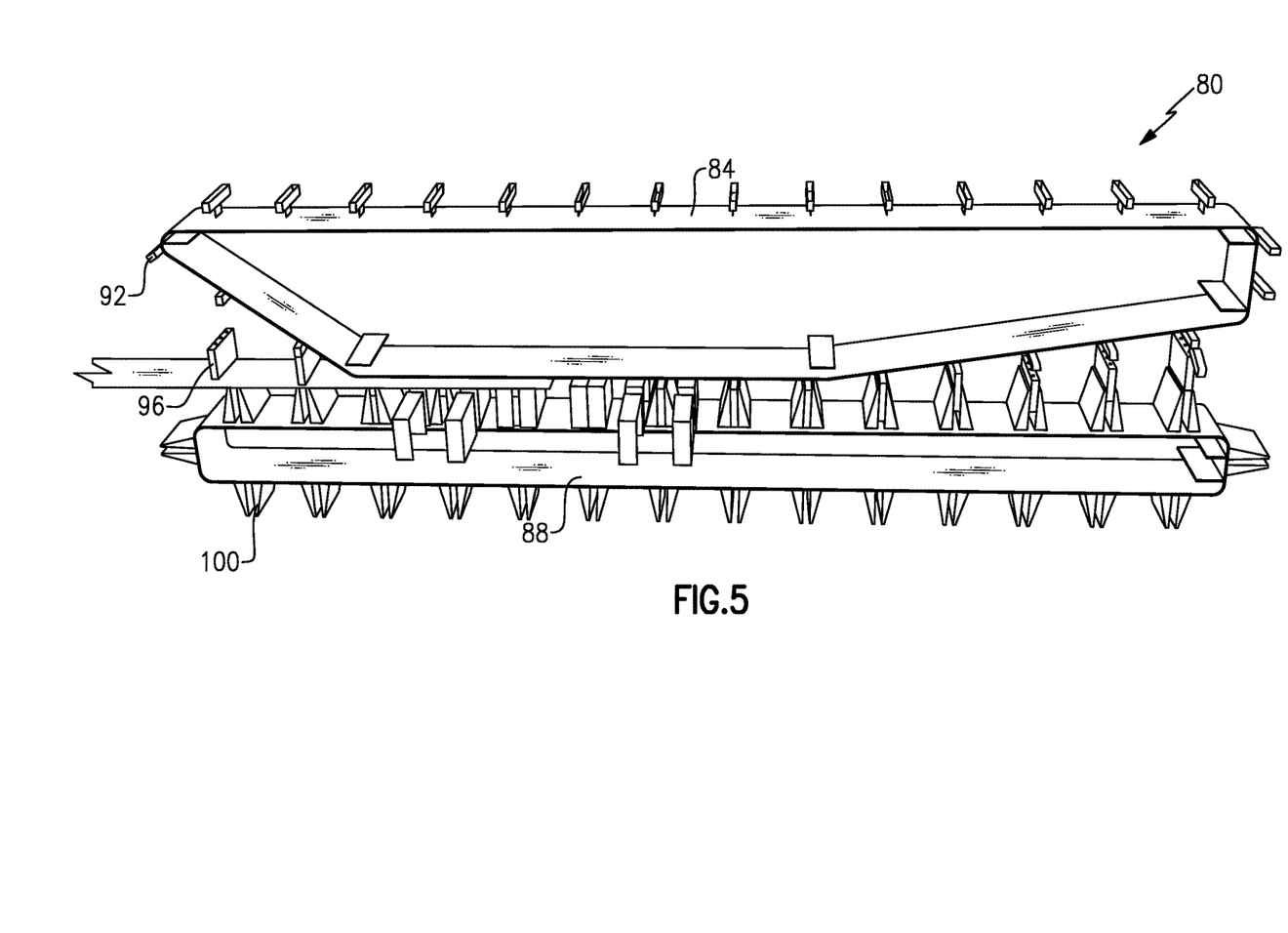
FIG. 5 shows a perspective view of selected portions of a shrink-wrapping assembly.

The second conveyor 88 includes a plurality of cell holders 100. The holders 100 can be made of an epoxy-based thermoset, such as syntactic foam, for example.

Figure 7:
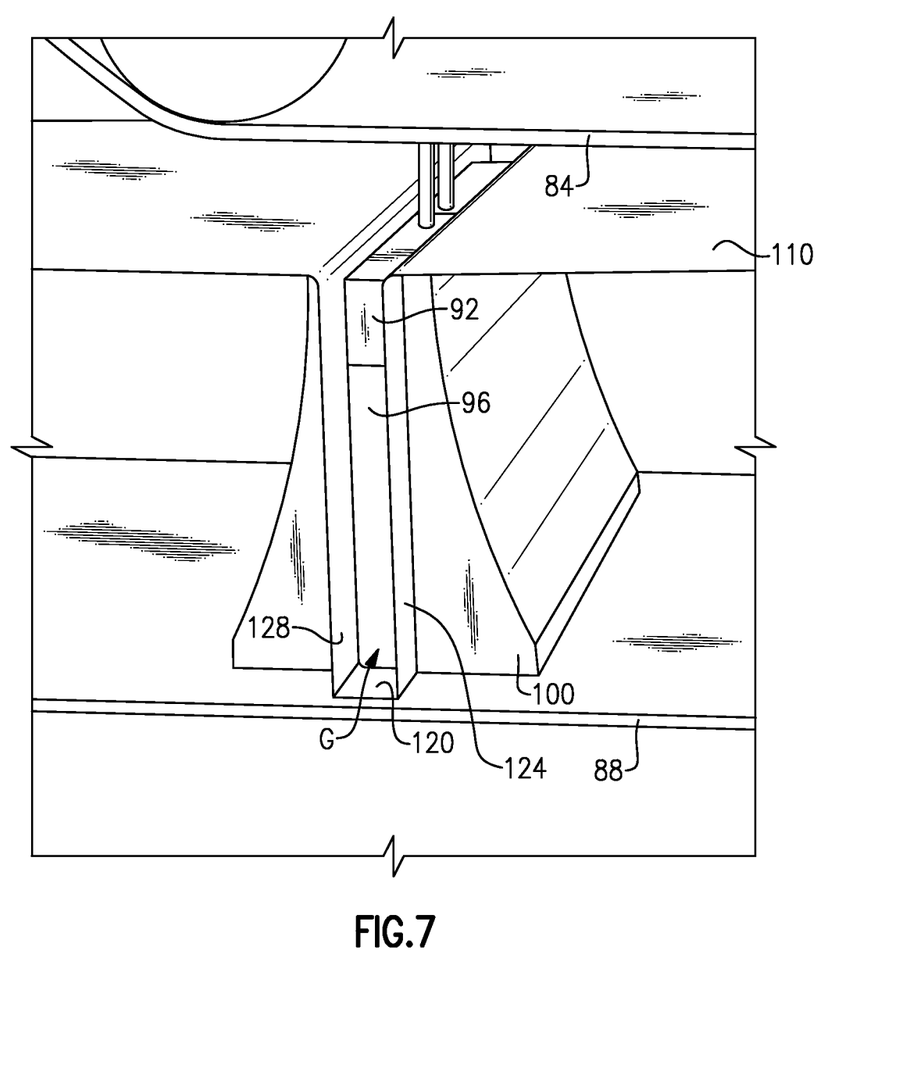
FIG. 7 shows a perspective view of an internal stage of the shrink-wrapping assembly sequentially after the entry stages of FIG. 6.

After the case 96 of the cell is secured to one of the caps 92, the assembly 80 moves to a stage of assembly shown in FIG. 7 where the case 96 is lowered into a gap G between the cell holders 100.

A sheet of shrink-wrap material 110 extends along the assembly 80 between the first carrier conveyor 84 and the second carrier conveyor 88. A spool provides the sheet of shrink-wrap material 110. When the case 96 is lowered into the gap G, the case 96 presses down on a first section 120 of the shrink-wrap material 110. Moving the case 96 further downward into the gap folds a second section 124 and a third section 128 of the shrink-wrap material 110 against the axially facing sides of the case 96. The first section 120, the second section 124, and the third section 128 are sections of the continuous sheet of shrink-wrap material 110.

The sheet of shrink-wrap material 110 is wider than the lateral dimension of the case 96. In this example, the shrink-wrap extends a distance D laterally past the case. Notably, the distance D is more than half of the width W of the laterally outward facing sides of the case 96.

Figure 8:
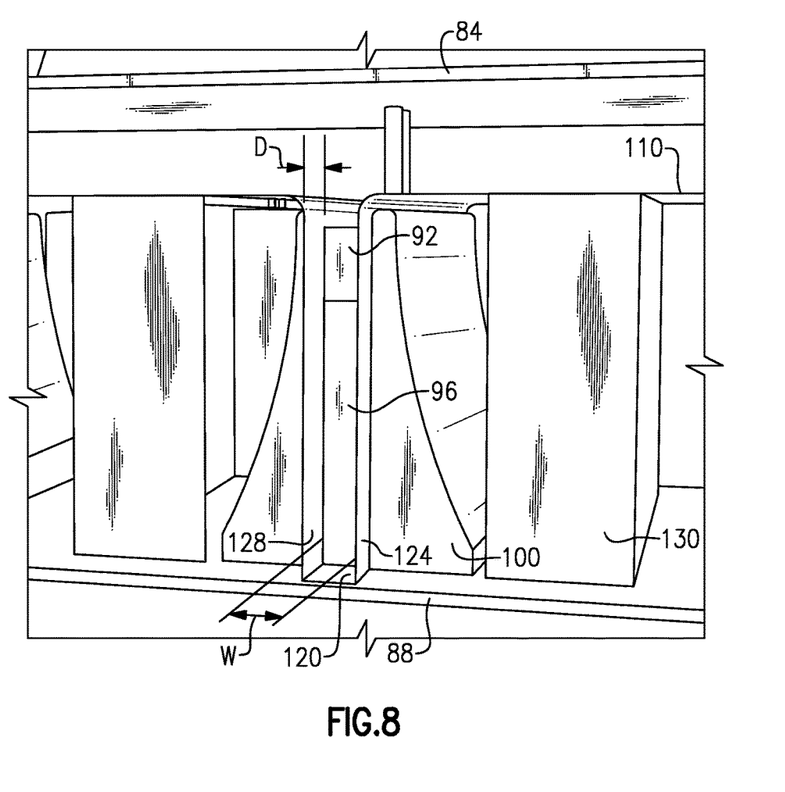
FIG. 8 shows a perspective view of another internal stage of the shrink-wrapping assembly sequentially after the internal stage of FIG. 7.

As shown in the stage of assembly of FIG. 8, a pair of sealers 130 slides into position within the assembly 80 between the first conveyor 84 and the second conveyor 88. Any suitable actuator may be utilized to slide and otherwise manipulate the positions of the sealers 130.

After moving between the first conveyor 84 and the second conveyor 88, the sealers 130 are moved toward each other and over a respective one of the holders 100. The sealers 130 include clearance to accommodate the cap 92 and its associated attachments to the conveyor 84.

The continuous sheet of wrap-material 110 is then cut so that an appropriate amount of wrap material 110 extends beyond the cap 92. This extra material will also extend a distance similar to distance D such that the extended material is notably more than half the width of the cap 92.

Figure 9:
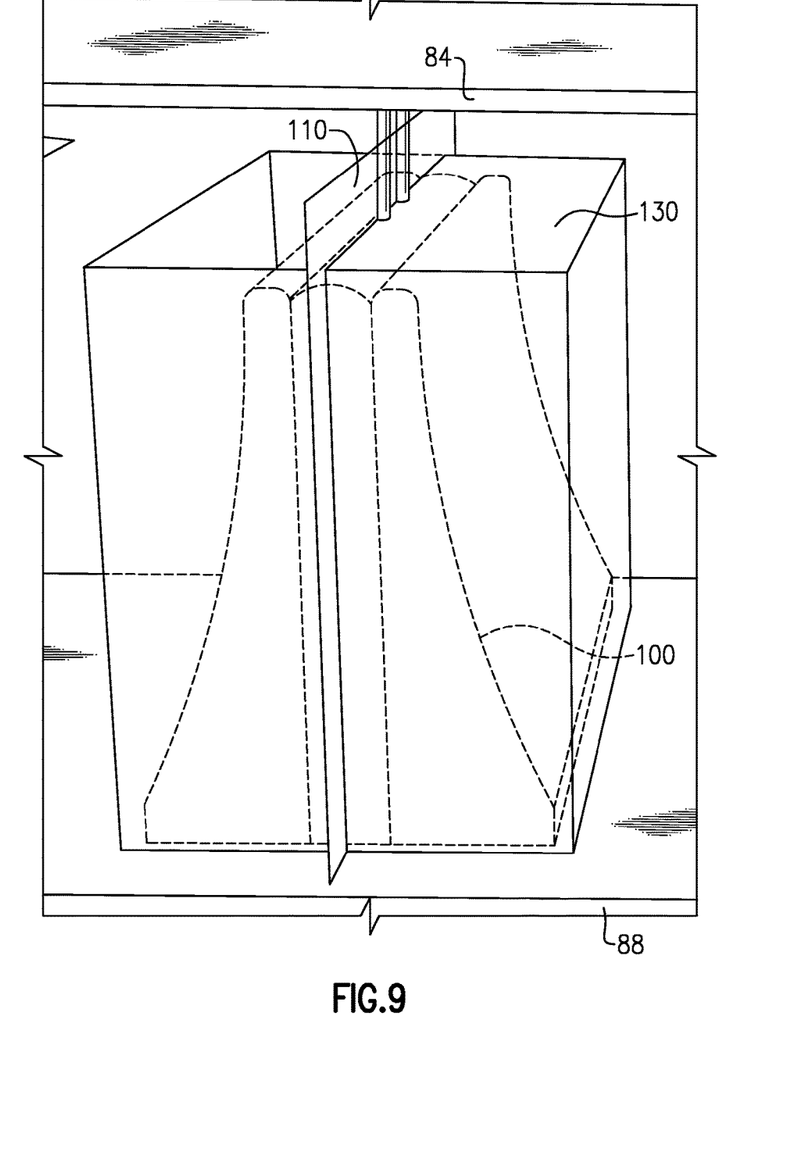
FIG. 9 shows a perspective view of another internal stage of the shrink-wrapping assembly sequentially after the internal stage of FIG. 8.

As shown in the assembly stage of FIG. 9, the example sealers 130 compress portions of the first section 120, the second section 124, and the third section 128 against each other. As can be appreciated, the sealers 130 compress the portions of shrink-wrap extending laterally past the case 96.

The sealers 130 can include heated areas to melt the shrink-wrap material 110 at or near when the shrink-wrap material 110 is contacted by the sealers 130.

Compressing and, optionally, heating the shrink-wrap material 110 joins the second section 124 to the third section 128 at laterally outboard edges of the case 96. The joining creates a seam at these edges and outboard of cap 92, which interfaces with the sixth side 30.

The cell 10 with surrounding wrap material 110 can then be moved through an oven where heat shrinks the shrink-wrap material 110 to conform to the approximate dimensions of the case 96 and the cap 92. The shrink-wrap material 110 may alternatively be heated at a later stage of assembly.

Figure 10:
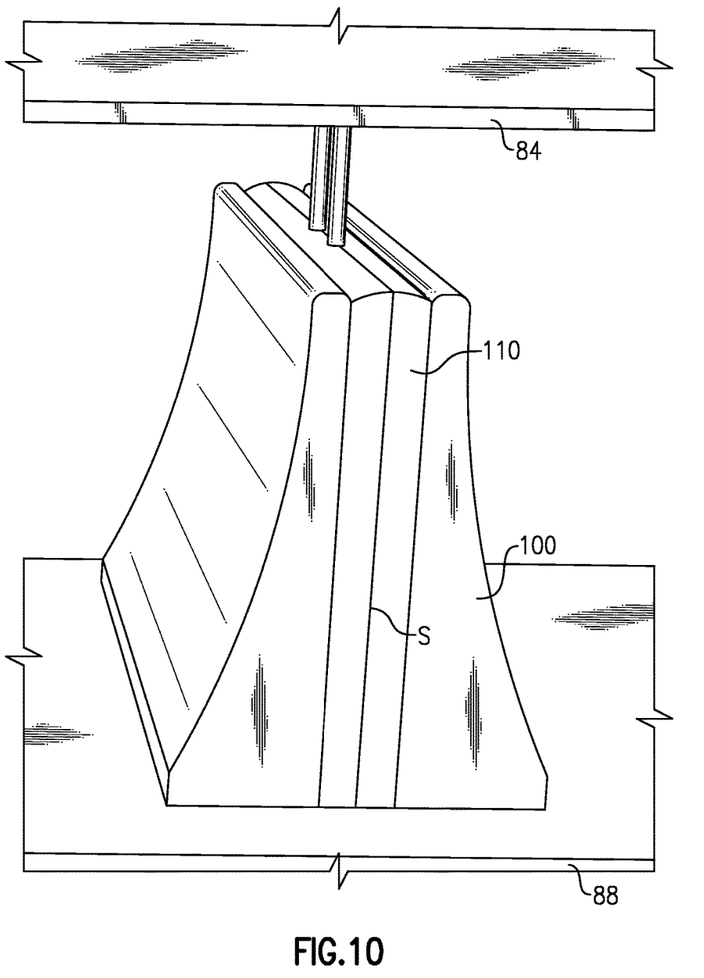
FIG. 10 shows a perspective view of another internal stage of the shrink-wrap assembly after the internal stage of FIG. 9.

The excess material can then be trimmed away leaving the case 96 with shrink-wrap shown in the assembly step of FIG. 10. The excess material may alternatively be trimmed at an earlier stage of assembly. The seams created by the joining are shown as seams S in FIG. 10.

Figure 11:
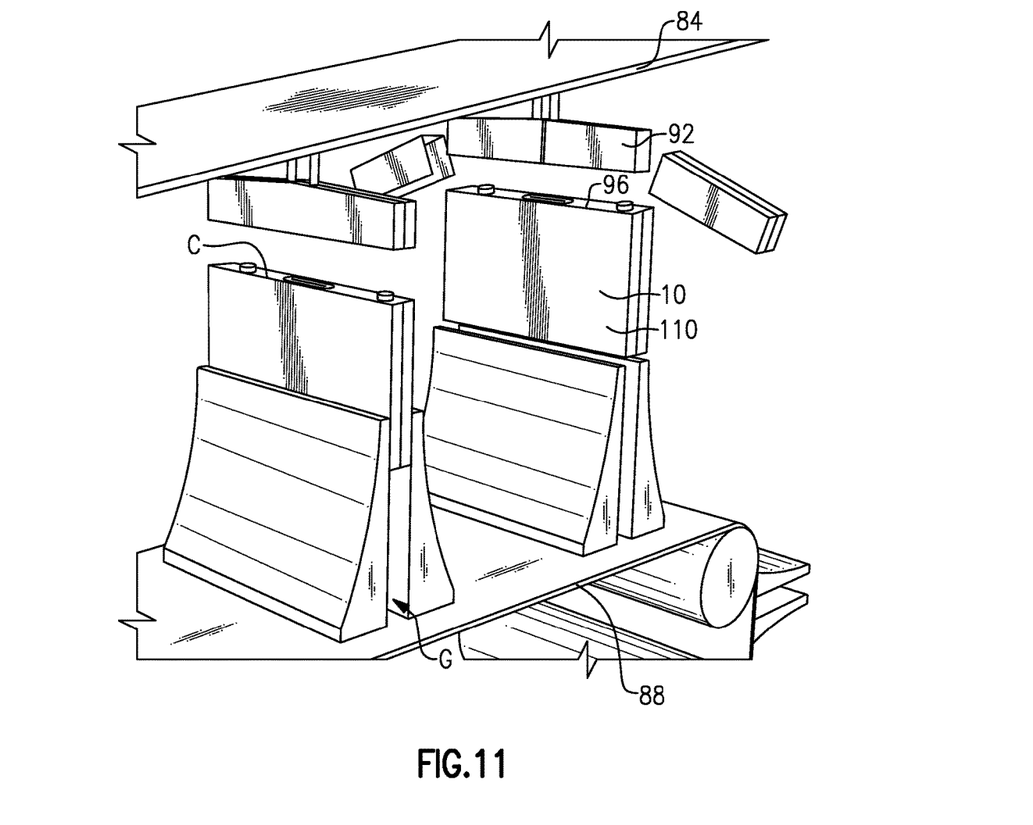
FIG. 11 shows a perspective view of exit stages of the shrink-wrap assembly of FIG. 5.

Referring now to FIG. 11, the first conveyor 84 then begins to separate from the second conveyor 88 removing the case 96 with shrink-wrap from the gap G.

A blade, a rotating knife, or some other cutting device, is then used to separate portions of the shrink-wrap material 110 covering the cap 92 from portions covering the case 96. The portions are separated at a cutline C. The cap 92 can then be pulled from the case 96, and the case supported laterally by arms (not shown).

The cutline C can be positioned so that a portion of shrink-wrap material extends upward past the sixth side 30. In one example, the shrink-wrap material 110 extends from 2 to 3 millimeters past the sixth side 30 (see FIG. 2).

Leaving some shrink-wrap material 110 extending past the sixth side ensures that the full vertical extending expanse of the cell 10 is covered in the shrink-wrap material 110. This vertical extension increases the distance for electricity to track between adjacent cells, allowing cells to be stacked closer to one another. Further, the approach reduces the likelihood of the cut edge C of shrink wrap material 110 occurring below the top of cell 10 due to, for example, thermal cooling effects or variations in process or material. Also, in some configurations, the cell warp material 110 extending past the sixth side 30 may increase the effectiveness of the shrink wrap to electrically isolate the sixth side (30) of the cell.

The cap 92 is then pulled away from the case 96 leaving the cell 10, which is covered in a shrink-wrap material on all sides except for the sixth side 30. The cap 92 prevented the shrink-wrap material 110 from covering the sixth side 30 during assembly.

The shrink-wrap material 110 secured to the cap 96 can be pulled from the cap 96 using suction cups, for example. The cutting device establishing the cutline C may further cut the shrink-wrap material 110 covering the cap 92 into two pieces.

Features of the disclosed examples include a battery cell that is shrink-wrapped and has a seamless interface to a cold plate. Another feature includes wrapping at least three surfaces in a way to prevent defects and seams. Another feature is feeding the shrink-wrap material directly from a spool, which eliminates preprocessing of the shrink-wrap material.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A battery cell shrink-wrapping method, comprising:
   covering first, second, and third sides of a battery cell with respective first, second, and third sections of a shrink-wrap material;
   after the covering, joining laterally outer portions of the second and third sections, and shrinking the first, second, and third sections onto the battery cell; and
   placing the first side covered by the first section against a cold plate within a battery pack, wherein the first section is seamless.

2. The method of claim 1, wherein the second and third sides extend from opposing edges of the first side transversely to the first side.

3. The method of claim 2, comprising covering laterally outward facing sides of the battery cell with the shrink-wrap material during the joining.

4. A shrink-wrapping method, comprising:
   covering a first, second, and third side of a battery cell with a respective first, second, or third section of a shrink-wrap material, the second and third sides extending from opposing edges of the first side transversely to the first side, the first side configured to interface with a battery pack cold plate;
   joining laterally outer portions of the second and third sections to cover laterally outward facing sides of the battery cell with the shrink-wrap material;
   heating the shrink-wrap material after the joining to shrink the shrink-wrap material to the battery cell; and
   inserting the battery cell within a pocket provided by a cell holder when placing the second section against the second side and when placing the third section against the third side.

5. A battery cell shrink-wrapping method, comprising:
covering a first side of a battery cell with a first section of a shrink-wrap material, the first side configured to interface with a cold plate when the battery cell is within a battery pack;
covering a second side of the battery cell with a second section of the shrink-wrap material;
covering a third side of the battery cell with a third section of the shrink-wrap material; and
positioning a cap adjacent a fourth side of the battery cell during the covering to block shrink-wrap material from covering the fourth side during the covering, wherein the fourth side faces away from the first side.

6. The method of claim 5, comprising wrapping the cap covering the fourth side during the heating rather than wrapping the fourth side.

7. The method of claim 1, comprising compressing the laterally outer portions of the second section and the laterally outer portions of the third section during the joining.

8. The method of claim 1, comprising placing the second side covered by the second section and the third side covered by the third section against separators within the battery pack.

9. The method of claim 1, comprising inserting the battery cell within a pocket provided by a cell holder when placing the second section against the second side and when placing the third section against the third side.

10. A battery cell assembly, comprising;
a case having a side to interface directly with a cold plate within a battery pack;
a section of a shrink-wrap material covering the side; and
a cap adjacent another side of the battery cell, the cap blocking the shrink-wrap material from covering the other side.

11. The assembly of claim 10, wherein the section is seamless.

12. The assembly of claim 10, wherein the section is a first section and the side is a first side, and further comprising a second section of the shrink-wrap material covering a second side of the case and a third section of the shrink-wrap material covering a third side of the case, wherein the first section, the second section, and the third section are seamless, wherein laterally outer edges of the second and third sections extend past opposing lateral sides of the case and are spaced from each other.

13. The assembly of claim 10, wherein the section is a first section and the side is a first side, and further comprising a second section of the shrink-wrap material covering a second side of the case and a third section of the shrink-wrap material covering a third side of the case, wherein the first section, the second section, and the third section are seamless, wherein the second section and the third section are joined at a seam to cover at least a portion of a laterally outward facing side of the case.

14. The assembly of claim 10, wherein the case includes laterally outward facing sides each covered by a section of shrink-wrap material having a seam.

15. The assembly of claim 10, wherein two of the sides are covered by shrink-wrap having seams, and three of the sides are covered by shrink-wrap having no seams.

16. The assembly of claim 13, comprising the cold plate of the battery pack, the side interfacing directly with the cold plate, wherein the other side is opposite the side.

* * * * *

UNITED STATES PATENT AND TRADEMARK OFFICE
CERTIFICATE OF CORRECTION

PATENT NO. : 9,614,198 B2  
APPLICATION NO. : 14/294846  
DATED : April 4, 2017  
INVENTOR(S) : Hyung Min Baek and Brian Utley Page 1 of 1

It is certified that error appears in the above-identified patent and that said Letters Patent is hereby corrected as shown below:

In the Claims

In Claim 6, Column 7, Line 16; before "heating" delete "the"

Signed and Sealed this
Tenth Day of October, 2017

Joseph Matal
*Performing the Functions and Duties of the*
*Under Secretary of Commerce for Intellectual Property and*
*Director of the United States Patent and Trademark Office*